United States Patent
Espeland et al.

(10) Patent No.: US 11,435,483 B2
(45) Date of Patent: Sep. 6, 2022

(54) SYSTEM FOR TESTING THE ACCURACY OF THE AUTOMATIC POSITIONING MEANS OF A SIGNAL TRACKING ANTENNA

(71) Applicant: QUADSAT IVS, Odense C (DK)

(72) Inventors: Joakim Espeland, Odense C (DK); Andrian Buchi, Odense C (DK)

(73) Assignee: QUADSAT IVS, Odense (DK)

( * ) Notice: Subject to any disclaimer, the term of this patent is extended or adjusted under 35 U.S.C. 154(b) by 346 days.

(21) Appl. No.: 16/465,082

(22) PCT Filed: Nov. 29, 2017

(86) PCT No.: PCT/EP2017/080823
§ 371 (c)(1),
(2) Date: May 29, 2019

(87) PCT Pub. No.: WO2018/099970
PCT Pub. Date: Jun. 7, 2018

(65) Prior Publication Data
US 2019/0331800 A1    Oct. 31, 2019

(30) Foreign Application Priority Data

Nov. 29, 2016 (DK) .............................. PA201670941

(51) Int. Cl.
| | |
|---|---|
| *G01S 19/23* | (2010.01) |
| *G01S 3/02* | (2006.01) |
| *H01Q 3/00* | (2006.01) |
| *H04B 7/185* | (2006.01) |

(52) U.S. Cl.
CPC .............. *G01S 19/23* (2013.01); *G01S 3/023* (2013.01); *H01Q 3/00* (2013.01); *H04B 7/18506* (2013.01); *H04B 7/18519* (2013.01)

(58) Field of Classification Search
CPC ....... G01S 19/23; G01S 3/023; G08G 5/0069; H04B 7/18506
USPC ...................................................... 342/357.62
See application file for complete search history.

(56) References Cited

U.S. PATENT DOCUMENTS

| | | | |
|---|---|---|---|
| 7,218,273 B1 | 5/2007 | Webster, Jr. et al. | |
| 7,956,806 B2 | 6/2011 | Liu et al. | |
| 9,507,019 B1 | 11/2016 | Lyon et al. | |
| 9,711,851 B1 * | 7/2017 | Cesarano | B64C 39/024 |
| 10,466,700 B1 * | 11/2019 | Carmack | H04K 3/224 |

(Continued)

FOREIGN PATENT DOCUMENTS

| | | |
|---|---|---|
| CN | 105548976 A | 5/2016 |
| EP | 2801838 A1 | 11/2014 |

OTHER PUBLICATIONS

Danish Search Report and Written Opinion dated Apr. 20, 2017, regarding Danish Patent Application No. PA2016709041.

(Continued)

*Primary Examiner* — Harry K Liu
(74) *Attorney, Agent, or Firm* — ArentFox Schiff LLP

(57) ABSTRACT

The present invention relates to a method for testing the accuracy of the automatic positioning means of a signal tracking antenna during a satellite signal searching and/or tracking operation; wherein the platform, such as a ship, on which the signal tracking antenna is mounted is kept stationary during the testing operation. The method includes the use of an unmanned aerial vehicle and a control station.

17 Claims, 7 Drawing Sheets

(56) References Cited

U.S. PATENT DOCUMENTS

| | | | |
|---|---|---|---|
| 2002/0180634 A1 | 12/2002 | Carson | |
| 2014/0327564 A1* | 11/2014 | Sampigethaya | G08G 5/0013 |
| | | | 342/32 |
| 2016/0245899 A1 | 8/2016 | Rybski | |
| 2016/0309291 A1* | 10/2016 | Rodriguez Montejano | ............... |
| | | | H04L 43/16 |
| 2017/0069214 A1* | 3/2017 | Dupray | G08G 5/0013 |
| 2018/0192298 A1* | 7/2018 | Noerpel | H04B 7/18523 |
| 2019/0235086 A1* | 8/2019 | Meng | G05D 1/0278 |

OTHER PUBLICATIONS

Invitation to Respond to Written Opinion in the corresponding Singapore Application No. 11201904793R dated Oct. 6, 2020.
International Search Report and Written Opinion dated Mar. 14, 2018, regarding PCT/EP2017/080823.

* cited by examiner

SYSTEM FOR TESTING THE ACCURACY OF THE AUTOMATIC POSITIONING MEANS OF A SIGNAL TRACKING ANTENNA

CROSS REFERENCE TO RELATED APPLICATION(S)

This application claims the benefit of International Application Serial No. PCT/EP2017/080823, entitled "SYSTEM FOR TESTING THE ACCURACY OF THE AUTOMATIC POSITIONING MEANS OF A SIGNAL TRACKING ANTENNA" and filed on Nov. 29, 2017, which claims priority to Danish Application Serial No. PA 2016 70941, entitled "System for Testing the Automatic Positioning Means of a Directional Antenna" and filed on Nov. 29, 2016, which are expressly incorporated by reference herein in their entirety.

BACKGROUND

Technical Field

The present invention relates to the testing of directional antennas, such as COTM antennas.

INTRODUCTION

The demand for mobile satellite communication is growing rapidly and with it, the demand for quality and stability.

Establishing communication between a moving vehicle (ship, car, airplane, etc.) and a satellite is done through the implementation of automatic antenna systems that will direct and keep the communication with the satellite either through mechanical (e.g. stabilized antennas) or electronic (e.g. phased array antennas) means. These antenna systems are known in the industry as Communication-On-The-Move (COTM) antennas. There are several tracking methods used by COTM antennas, e.g. monopulse sensing, sequential amplitude sensing, electronic beam squinting, program tracking, etc.

Such antenna systems can be classified as closed-loop or open-loop tracking systems. The closed-loop tracking systems rely on the reception of a continuous beacon signal, used to derive pointing error information, which supplies control signals to the antenna drive servo mechanisms. The antenna is then driven, so as to attempt to minimize the pointing error and hence null the tracking error. The open-loop tracking is using pre-programmed data or is based on algorithmically determined positions from the inertial navigations systems of both the COTM antenna and the source. Antennas can use one or multiple tracking methods, as well as closed loop, open loop, or both.

The mechanical and/or electronic performance of the COTM antenna has a significant impact on the pointing accuracy. Improper tracking due to faulty mechanisms leads to loss of contact with the transmitting/receiving source and to suffering of the communication link. When an antenna is new, it has probably passed a Factory Acceptance Test and therefore it must function accordingly to the set standards and specific parameters mentioned in the datasheets. However, with age, several issues may impact the antenna function, such as weather impact, harsh conditions, vibrations, and improper use. Hence, there is a need for servicing and upgrade.

COTM antenna systems are highly dependent on the electro-mechanical hardware components inside the antenna to compensate for external movements, meanwhile keeping accurate pointing position for optimal connectivity. Today there are three ways of testing the systems: 1) Factory Acceptance Test (FAT), 2) Sea trial and 3) Inspection by technician. None of these procedures is effective nor efficient. The FAT cannot be used onsite, and inspections by technicians can be hard to guarantee without a sea trial. These procedures may be considered, in some cases, inaccurate and only tests a fraction of the antennas' domain spectrum. Many vessels are mission critical and consider it too much effort, time and/or money to conduct a sea trial. These vessels will then proceed on their mission with a system that could be faulty, operate inaccurately or be vulnerable to failure, which can result in even higher costs.

It is therefore desirable to provide a system, which can stress test, calibrate and ease installation, while the platform, such as a vessel, remains stationary; and preferably regardless of which type of signal tracking mechanism the antenna uses.

SUMMARY

The inventors of the present invention have provided a system capable of testing the automatic positioning means of a directional antenna, such as a COTM antenna, supported by a mobile platform. The system is intended for use when the mobile platform, such as a ship, onto which it is mounted is stationary, thereby avoiding expensive sea trials.

A first aspect of the present invention relates to the use of an unmanned aerial vehicle and a control station for testing the accuracy of the automatic positioning means of a directional antenna, such as a signal tracking antenna (e.g. a COTM antenna or a phased array antenna), during a satellite signal searching and/or tracking operation; wherein the platform, such as a ship, on which the signal tracking antenna is mounted is kept stationary during the testing operation; wherein the unmanned aerial vehicle is adapted for:
  transmitting, while navigating a flight route, a signal configured for the signal tracking antenna to search for and/or to track;
  wherein the control station is adapted for:
  receiving positioning data from the automatic positioning means during a predefined test period; and
  receiving data, such as signal strength data, from the signal tracking antenna, about the received signal from the unmanned aerial vehicle during said predefined test period.

A second aspect relates to a system for testing the accuracy of the automatic positioning means of a directional antenna, such as a signal tracking antenna (e.g. a COTM antenna or a phased array antenna), during a satellite signal searching and/or tracking operation; the system comprising:
  an unmanned aerial vehicle; and
  a control station;
  wherein the unmanned aerial vehicle is adapted for:
  transmitting, while navigating a flight route, a signal configured for the directional antenna to search for and/or to track;
  wherein the control station is adapted for:
  receiving positioning data from the automatic positioning means during a predefined test period; and
  receiving data, such as signal strength data, from the directional antenna, about the received signal from the unmanned aerial vehicle during said predefined test period.

A third aspect of the present invention relates to the use of an unmanned aerial vehicle and a control station for testing the automatic positioning means of a directional antenna; wherein the unmanned aerial vehicle is adapted for:
- transmitting, while navigating, a tracking signal configured for the directional antenna to lock on; and
- continuously transmitting its position to the control station;

wherein the control station is adapted for:
- receiving positioning data from the unmanned aerial vehicle;
- calculating simulated positioning data of a directional antenna; and
- transmitting said calculated simulated positioning data to the control unit of an automatic positioning means of a directional antenna.

A fourth aspect relates to a system for testing the automatic positioning means of a directional antenna, the system comprising:
- an unmanned aerial vehicle; and
- a control station;

wherein the unmanned aerial vehicle is adapted for:
- transmitting, while navigating, a tracking signal configured for the directional antenna to lock on; and
- continuously transmitting its position to the control station;

wherein the control station is adapted for:
- receiving positioning data from the unmanned aerial vehicle;
- calculating simulated positioning data of a directional antenna based on the positioning data of the unmanned aerial vehicle; and
- transmitting said calculated simulated positioning data to the control unit of an automatic positioning means of a directional antenna.

A fifth aspect of the present invention relates to the use of an unmanned aerial vehicle and a control station for testing the automatic positioning means of a directional antenna supported by a mobile platform subject to continuous irregular motion; wherein the unmanned aerial vehicle is adapted for:
- transmitting, while navigating, a tracking signal configured for the directional antenna to lock on; and
- continuously transmitting its position to the control station;

wherein the control station is adapted for:
- receiving positioning data from the unmanned aerial vehicle;
- calculating simulated positioning data of a directional antenna; and
- transmitting said calculated simulated positioning data to the control unit of an automatic positioning means of a directional antenna.

A sixth aspect relates to a system for testing the automatic positioning means of a directional antenna supported by a mobile platform subject to continuous irregular motion, the system comprising:
- an unmanned aerial vehicle; and
- a control station;

wherein the unmanned aerial vehicle is adapted for:
- transmitting, while navigating, a tracking signal configured for the directional antenna to lock on; and
- continuously transmitting its position to the control station;

wherein the control station is adapted for:
- receiving positioning data from the unmanned aerial vehicle;
- calculating simulated positioning data of a directional antenna based on the positioning data of the unmanned aerial vehicle; and
- transmitting said calculated simulated positioning data to the control unit of an automatic positioning means of a directional antenna.

DETAILED DESCRIPTION

Figure 1:
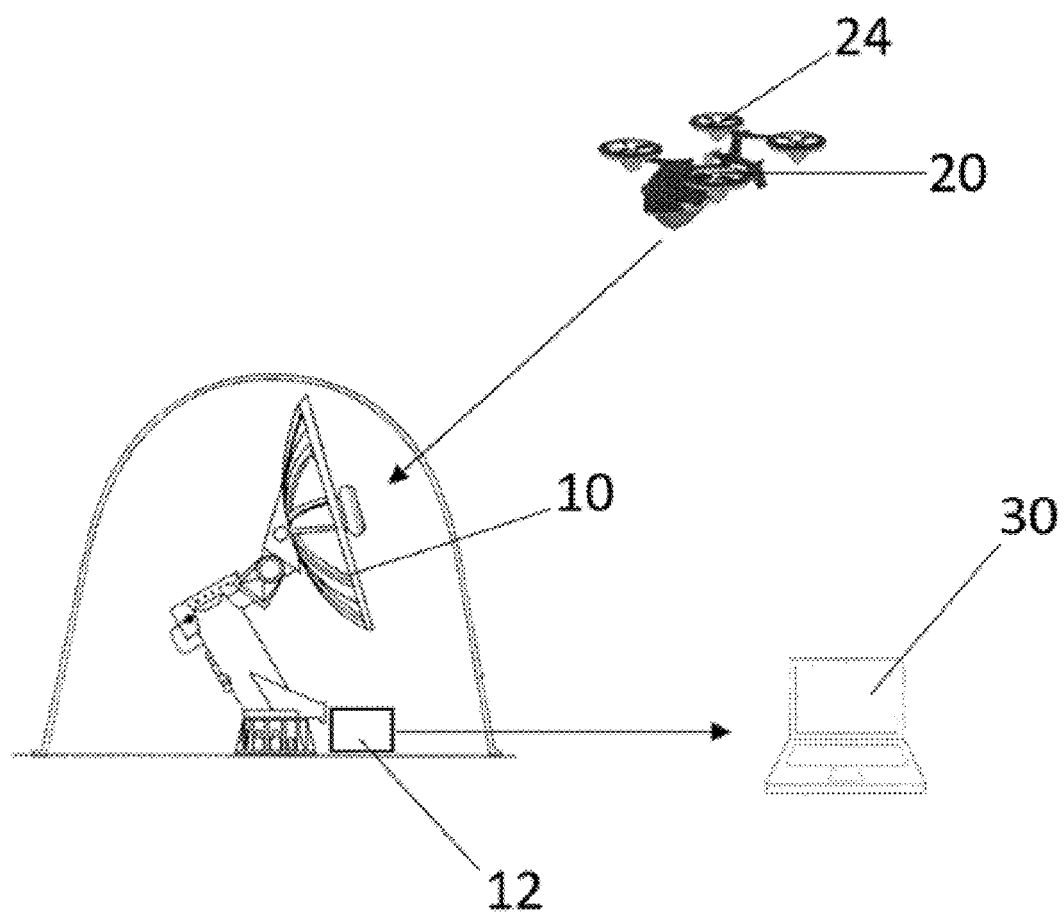
FIG. 1 shows a system for testing the automatic positioning means of a stabilized satellite communication antenna supported by a mobile platform in accordance with various embodiments of the invention.

A first aspect of the present invention relates to the use of an unmanned aerial vehicle and a control station for testing the accuracy of the automatic positioning means of a directional antenna, such as a signal tracking antenna (e.g. a COTM antenna or a phased array antenna), during a satellite signal searching and/or tracking operation; wherein the platform, such as a ship, on which the signal tracking antenna is mounted is kept stationary during the testing operation; wherein the unmanned aerial vehicle is adapted for:
- transmitting, while navigating a flight route, a signal configured for the signal tracking antenna to search for and/or to track;

wherein the control station is adapted for:
- receiving positioning data from the automatic positioning means during a predefined test period; and
- receiving data, such as signal strength data, from the signal tracking antenna, about the received signal from the unmanned aerial vehicle during said predefined test period.

The term "signal" may be used to encompass many forms of content, including, but not limited to, a beacon, video (e.g. Direct Broadcast Satellite (DBS), and Digital Video Broadcasting (DVB)), still images, audio, text, or any other form of intelligence, or data (e.g. identity data). The unmanned aerial vehicle is capable of simulating any type of satellite, and in some embodiments, also capable of distorting and/or fading the signal to simulate different weather conditions, such as heavy rain fall. The signal source will be used to test both the searching and tracking functions of the directional antenna. The functioning of the automatic positioning means is crucial in these functions. Hence, the unmanned aerial vehicle, such as a drone, simulates the satellite and the platform motion. The unmanned aerial vehicle may also simulate multiple spot beam switching, as well as switching between different satellites (e.g. regional or traffic/loading optimization).

Directional antenna systems (e.g. COTM antennas), such as parabolic reflector antennas or yagi type antennas, installed on a moving platform are usually steerable to adequately receive radio waves from remote satellites. To continuously point in the direction of the satellite under platform heading motions, the antenna is commonly steered by automatic positioning means (mechanical or electronic means). A variety of technologies have been developed to steer or direct the antenna to point at the satellite under heading changes. When the directional antenna is mounted aboard a vessel subject to heavy seas, maintaining antenna tracking of e.g. the satellite's RF beacon or an identity signal requires positioning data of the antenna relative to the ship's roll, yaw, and pitch motion; otherwise known as the attitude and heading reference of the antenna relative to the ship's attitude and reference. The ship's attitude and heading information is typically provided by expensive inertial navigation systems mounted to the ship. Inertial navigational systems are not typically suitable, due to weight and size, to mount directly to the antenna pedestal or dish. For this reason, the attitude and heading reference of the antenna is typically derived from the ship's inertial navigation system.

If the directional antenna is not functioning correctly, it will not be able to find and track the signal from the unmanned aerial vehicle. This may be controlled visually, by sensors (e.g. vibration sensors, or camera sensors), or by reading the test output data from the control station configured for recording the performance of the electromechanical and/or electronic components of the automatic positioning means and/or the input signal quality of the tracking signal. The electromechanical components may e.g. be servo amplifiers, and drive dc motors, which adjust the antenna (reflector), azimuth, and elevation. Other electromechanical components may be potentiometers and sensors that provide real time data about the relative azimuth and elevation angles of the antenna reflector. Being a constantly moving system, there are also interconnecting cable assemblies, bearings, belts, etc. that will wear out over time, or merely be damaged (e.g. during production, shipping, physical installation, calibration) from the first installation of the antenna. Furthermore, power supplies may age/malfunction, e.g. due to the sometimes very high internal temperature within the antenna radome.

In one or more embodiments, the control station is configured to a) output the received positioning data, and data about the received signal and/or b) compare the received positioning data, and data about the received signal with reference values from previous tests and/or with data sheets from the antenna manufacturer.

Global positioning system (GPS) receivers are commonly used in such steering systems to provide a moving platform's track, wherein the track is the vehicle's course over ground or water.

Directional antennas are commonly housed under radomes. A radome is usually necessary to make the antenna resistant to object collisions, wind, moisture, dirt, and corrosive gasses. The radome is usually mounted on a radome base and is removable to facilitate maintenance and repair work.

In one or more embodiments, the control station is configured to receive positioning data from the unmanned aerial vehicle during a test period; and
    instructing the automatic positioning means to initiate and/or continue the satellite signal searching and/or tracking operation based on the positioning data from the unmanned aerial vehicle.

In one or more embodiments, the control station is configured to receive positioning data from the unmanned aerial vehicle during a test period;
    calculating simulated positioning data of a directional antenna; and
    transmitting said calculated simulated positioning data to the control unit of an automatic positioning means of a directional antenna;
wherein the calculation of simulated positioning data of a directional antenna is based on the positioning data from the unmanned aerial vehicle. Other parameters used in the calculation of simulated positioning data of a directional antenna may be antenna position during test, and simulated satellite position.

In one or more embodiments, the control station is further configured to:
    receive positioning data from the unmanned aerial vehicle during a test period; and
    compare the received positioning data from the unmanned aerial vehicle, the positioning data from the automatic positioning means, and data about the received signal with reference values from previous tests.

In one or more embodiments, the unmanned aerial vehicle is configured for continuously transmitting its position to the control station.

In one or more embodiments, the control station is integrated into the signal tracking antenna.

In one or more embodiments, the unmanned aerial vehicle is further adapted for:
    receiving a test flight route from the control station;
    automatically navigating the received test flight route with the aid of a received Global Navigation Satellite System signal; and
wherein the control station is further adapted for:
    transmitting a test flight route signal to the unmanned aerial vehicle.

In one or more embodiments, the calculation of simulated positioning data of a directional antenna is based on the positioning data from the unmanned aerial vehicle. This will enable the control station to steer the directional antenna towards the unmanned aerial vehicle (e.g. a drone, such as a fixed-wing drone, a tricopter, a quadcopter, a hexacopter, an octocopter, or the like) as it moves around.

In one or more embodiments, the unmanned aerial vehicle is further adapted for:
    receiving a test flight route from the control station;
    automatically navigating the received test flight route with the aid of a received Global Navigation Satellite System signal; and
    transmitting, while navigating the received flight route, a tracking signal configured for the directional antenna to lock on;
wherein the control station is further adapted for:
    transmitting a test flight route signal to the unmanned aerial vehicle.

Global Navigation Satellite Systems (GNSS) is a collective term for a variety of satellite navigation systems, which use orbiting satellites as navigation reference points to determine position fixes on the ground. GNSS includes the Global Positioning System (GPS), the Global Navigation Satellite System (GLONASS), the Compass system, Galileo, and a number of Satellite based augmentation systems (SBAS).

In typical civilian applications, a single GNSS receiver can measure a ground position with a precision of about ten meters. This is, in part, due to various error contributions, which often reduce the precision of determining a position fix. For example, as the GNSS signals pass through the ionosphere and troposphere, propagation delays may occur. Other factors, which may reduce the precision of determining a position fix, may include satellite clock errors, GNSS receiver clock errors, and satellite position errors. One method for improving the precision for determining a position fix is Real-Time Kinematic (RTK) GNSS. Real Time Kinematic (RTK) satellite navigation is a technique using the phase of the signal's carrier wave, rather than the information content of the signal, and relies on a single reference station or interpolated virtual station to provide real-time corrections.

In one or more embodiments, the unmanned aerial vehicle comprises a Real Time Kinematic (RTK) GNSS positioning system.

Other methods like PPK (Post-Processed Kinematics), SBAS (satellite-based augmentation systems), PPP (Precise Point Positioning), or Differential GNSS may also be used. In one or more embodiments, the unmanned aerial vehicle comprises a PPK (Post-Processed Kinematics), SBAS (satellite-based augmentation systems), PPP (Precise Point Positioning), or Differential GNSS positioning system.

In one or more embodiments, the unmanned aerial vehicle is manually navigated.

In one or more embodiments, the control station is configured to bypass the integrated position measuring means of an automatic positioning means of a directional antenna.

A second aspect relates to a system for testing the accuracy of the automatic positioning means of a directional antenna, such as a signal tracking antenna (e.g. a COTM antenna or a phased array antenna), during a satellite signal searching and/or tracking operation; the system comprising:
  unmanned aerial vehicle; and
  a control station;
  wherein the unmanned aerial vehicle is adapted for:
  transmitting, while navigating a flight route, a signal configured for the signal tracking antenna to search for and/or to track;
  wherein the control station is adapted for:
  receiving positioning data from the automatic positioning means during a predefined test period; and
  receiving data, such as signal strength data, from the signal tracking antenna about the received signal from the unmanned aerial vehicle during said predefined test period.

A third aspect of the present invention relates to the use of an unmanned aerial vehicle and a control station for testing the automatic positioning means of a directional antenna;
  wherein the unmanned aerial vehicle is adapted for:
  transmitting, while navigating, a tracking signal configured for the directional antenna to lock on; and
  continuously transmitting its position to the control station;
  wherein the control station is adapted for:
  receiving positioning data from the unmanned aerial vehicle;
  calculating simulated positioning data of a directional antenna; and
  transmitting said calculated simulated positioning data to the control unit of an automatic positioning means of a directional antenna.

A fourth aspect relates to a system for testing the automatic positioning means of a directional antenna, the system comprising:
  unmanned aerial vehicle; and
  a control station;
  wherein the unmanned aerial vehicle is adapted for:
  transmitting, while navigating, a tracking signal configured for the directional antenna to lock on; and
  continuously transmitting its position to the control station;
  wherein the control station is adapted for:
  receiving positioning data from the unmanned aerial vehicle;
  calculating simulated positioning data of a directional antenna based on the positioning data of the unmanned aerial vehicle; and
  transmitting said calculated simulated positioning data to the control unit of an automatic positioning means of a directional antenna.

In one or more embodiments, the unmanned aerial vehicle is further adapted for:
  receiving a test flight route from the control station;
  automatically navigating the received test flight route with the aid of a received Global Navigation Satellite System signal; and
  transmitting, while navigating the received flight route, a tracking signal configured for the directional antenna to lock on;
  wherein the control station is further adapted for:
  transmitting a test flight route signal to the unmanned aerial vehicle.

In one or more embodiments, the calculation of simulated positioning data of a directional antenna is based on the positioning data from the unmanned aerial vehicle.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

The general aspects of the invention are described in the following with references to the FIGS. 1-6.

FIG. 1 shows a system for testing the automatic positioning means of a stabilized satellite communication antenna 10 supported by a mobile platform (not shown) in accordance with various embodiments of the invention. The system comprises an unmanned aerial vehicle 20, and a control station 30. The unmanned aerial vehicle 20 is here represented as a quadcopter with four rotors 24. The unmanned aerial vehicle 20 is adapted for transmitting, while navigating a flight route, a signal configured for the stabilized satellite communication antenna 10 to search for and/or to track. The signal may e.g. be a simulated satellite signal.

The control station 30 is adapted for a) receiving positioning data from the automatic positioning means during a predefined test period; and b) receiving data from the stabilized satellite communication antenna about the received signal from the unmanned aerial vehicle 20 during said predefined test period. During the testing operation, the stabilized satellite communication antenna 10 does not transmit, but only receives.

Figure 2:
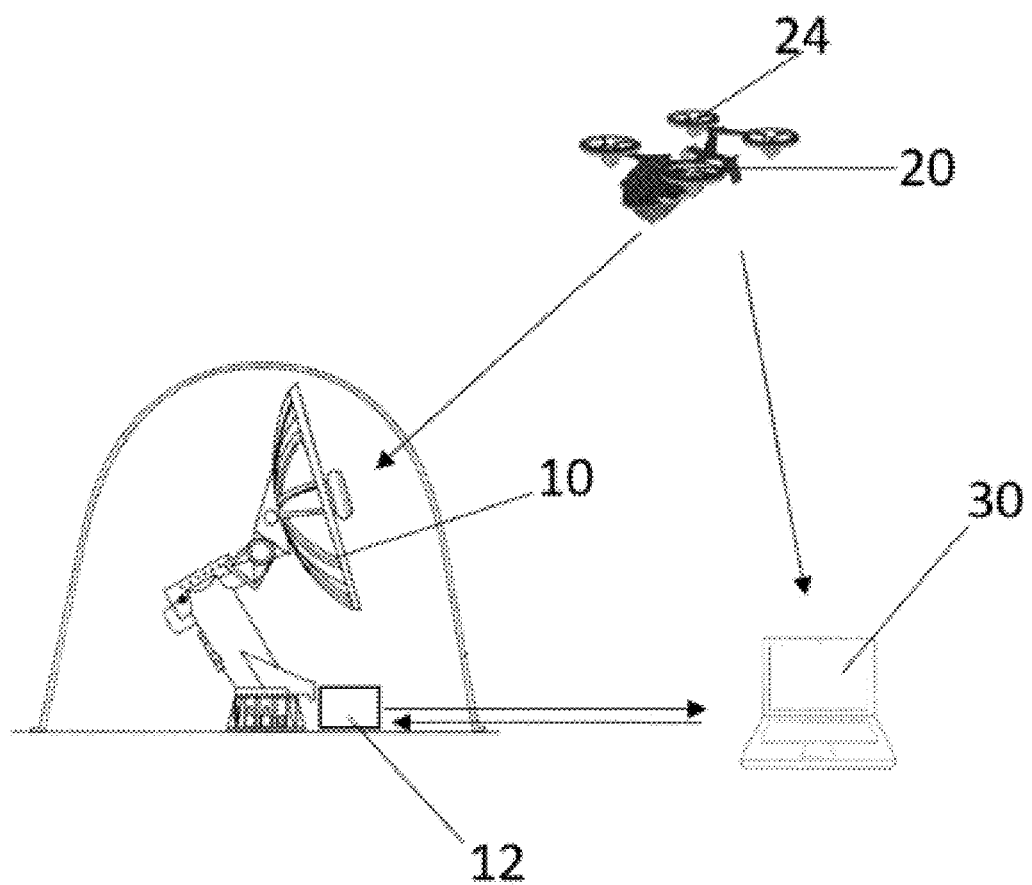
FIG. 2 shows a system for testing the automatic positioning means of a stabilized satellite communication antenna supported by a mobile platform in accordance with various embodiments of the invention.

FIG. 2 shows a system for testing the automatic positioning means of a stabilized satellite communication antenna 10 supported by a mobile platform (not shown) in accordance with various embodiments of the invention. The system comprises an unmanned aerial vehicle 20, and a control station 30. The unmanned aerial vehicle 20 is here represented as a quadcopter with four rotors 24, and a signal transmitter (not shown) adapted for communicating with the UAV remote control and with the control station 30. The unmanned aerial vehicle 20 is adapted for a) transmitting, while navigating, a tracking signal configured for the stabilized satellite communication antenna 10 search for and/or to track; and b) continuously transmitting its position to the control station 30. The control station 30 is adapted for a) receiving positioning data from the unmanned aerial vehicle 20, b) calculating simulated positioning data of a stabilized satellite communication antenna 10 based on the positioning data of the unmanned aerial vehicle 20, and c) transmitting said calculated simulated positioning data to the control unit 12 of an automatic positioning means of a stabilized satellite communication antenna 10.

Figure 3:
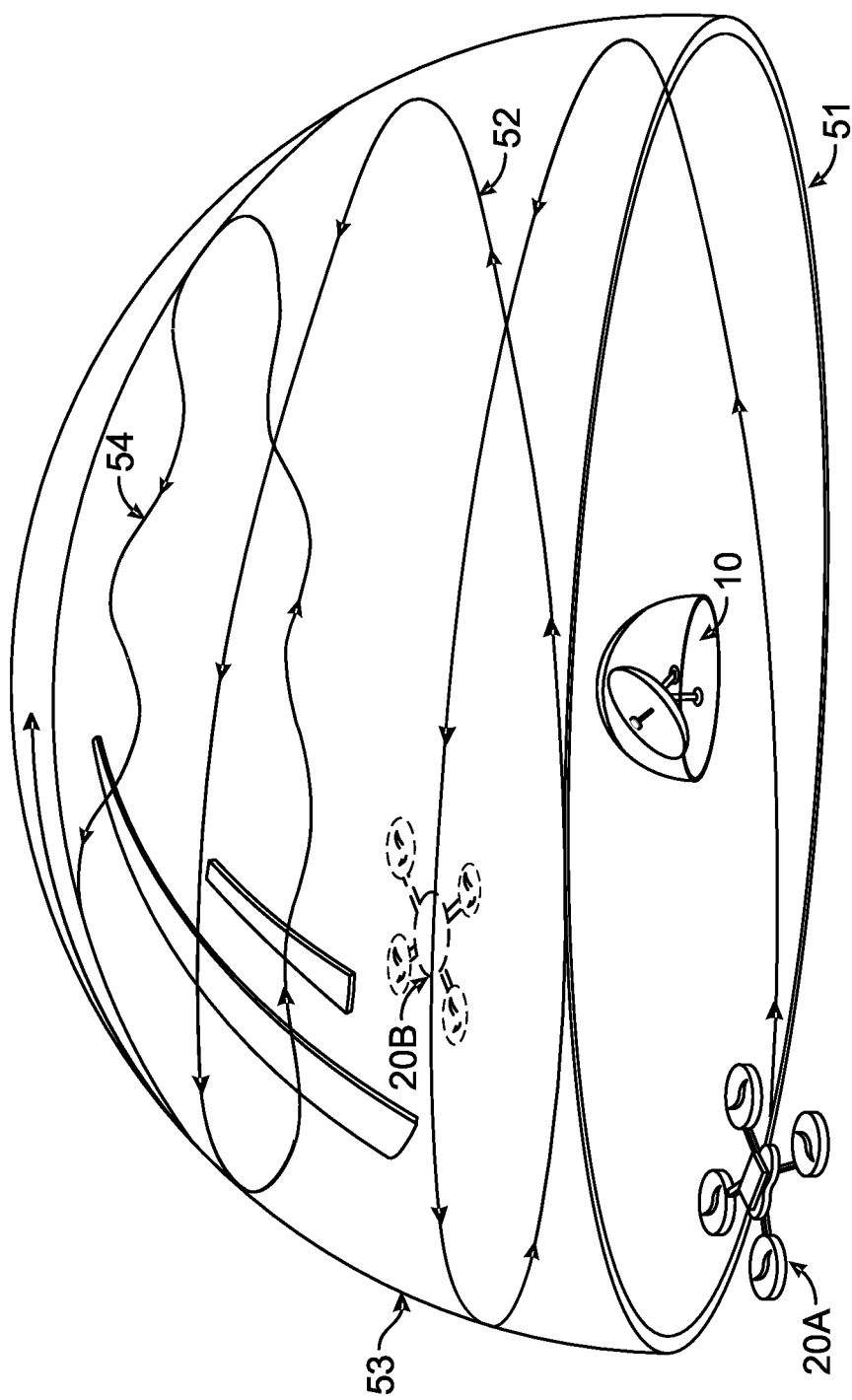
FIG. 3 shows an example of a test route that the quadcopter travels during a test operation.

FIG. 3 shows an example of a test route that the quadcopter travels during a test operation. Minimum antenna elevation limit 51; Test path 52 in Azimuth; Test path 53 in elevation; Test path 54 for simulating waves or other mobile platform motions; Drone in Position A (e.g. start position) (20A); and Drone in Position B (e.g. during test) (20B).

Figure 4:
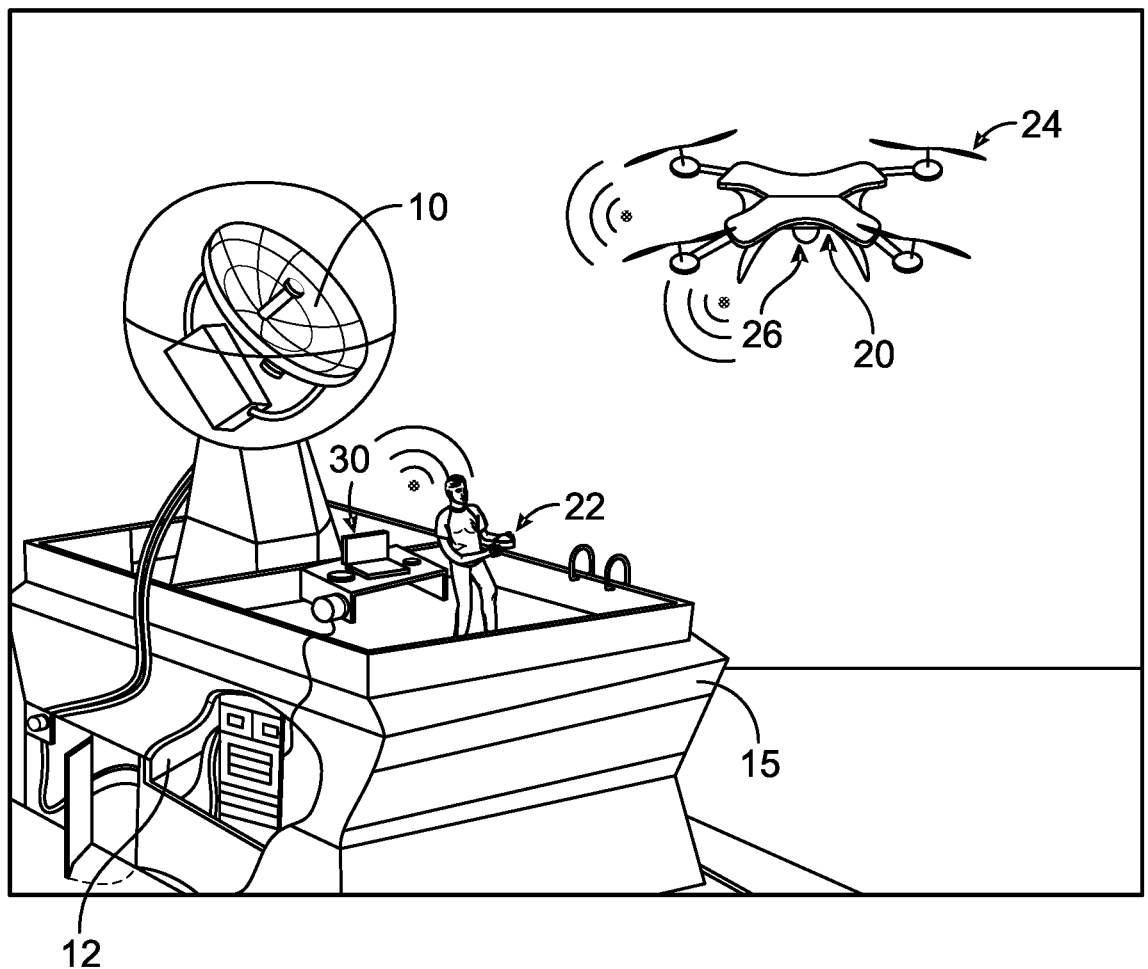
FIG. 4 shows a system for testing the automatic positioning means of a directional antenna supported by a mobile platform subject to continuous irregular motion in accordance with various embodiments of the invention.

FIG. 4 shows a system for testing the automatic positioning means of a directional antenna 10 supported by a mobile platform 15 subject to continuous irregular motion in accordance with various embodiments of the invention. The system comprises an unmanned aerial vehicle 20, and a control station 30. The unmanned aerial vehicle 20 is here represented as a quadcopter with four rotors 24, a UAV remote control 22 adapted for manually controlling the quadcopter, and a signal transmitter 26 adapted for communicating with the UAV remote control 22 and with the control station 30. The unmanned aerial vehicle 20 is adapted for a) transmitting, while navigating, a tracking signal configured for the directional antenna 10 to lock on; and b) continuously transmitting its position to the control station 30. The control station 30 is adapted for a) receiving positioning data from the unmanned aerial vehicle 20, b) calculating simulated positioning data of a directional antenna 10 based on the positioning data of the unmanned aerial vehicle 20, and c) transmitting said calculated simulated positioning data to the control unit 12 of an automatic positioning means of a directional antenna 10.

Figure 5:
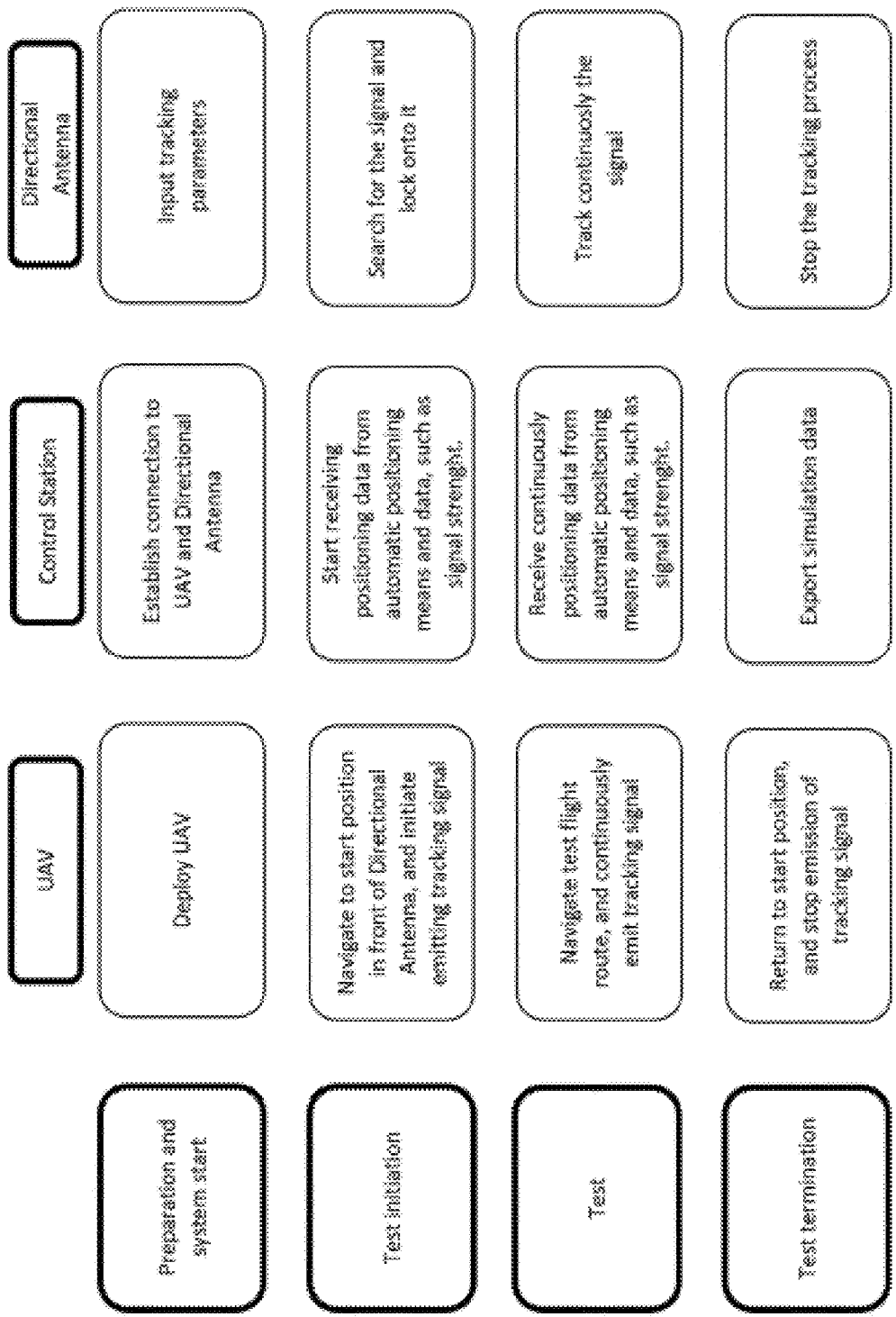
FIG. 5 shows selected process steps of the method in accordance with various embodiments of the invention.

FIG. 5 shows selected process steps of the method in accordance with various embodiments of the invention. The first process step is the "Preparation and system start" step, where a) the UAV is deployed, b) the Control station establish connection to the UAV and the Directional antenna, and c) the Directional antenna receives information on tracking parameters. The second step is the "Test initiation" step, where a) the UAV is navigated to the start position in front of the Directional antenna, and initiates emitting the tracking signal, b) the Control station starts to receive positioning data from the automatic positioning means, and data, such as signal strength, and c) the Directional antenna search for and locks onto the tracking signal from the UAV. The third step is the "Test step", where a) the UAV starts to navigate the test flight route, and continuously emits the tracking signal, b) the Control station continuously receives positioning data from the automatic positioning means, and data, such as signal strength, and c) the Directional antenna continuously tracks using the tracking signal. The fourth step is the "Test termination" step, where a) the UAV returns to the start position, and stops the emission of the tracking signal, b) the Control station exports the simulation data for analysis, and c) the Directional antenna stops locking onto tracking signal from the UAV.

Figure 6:
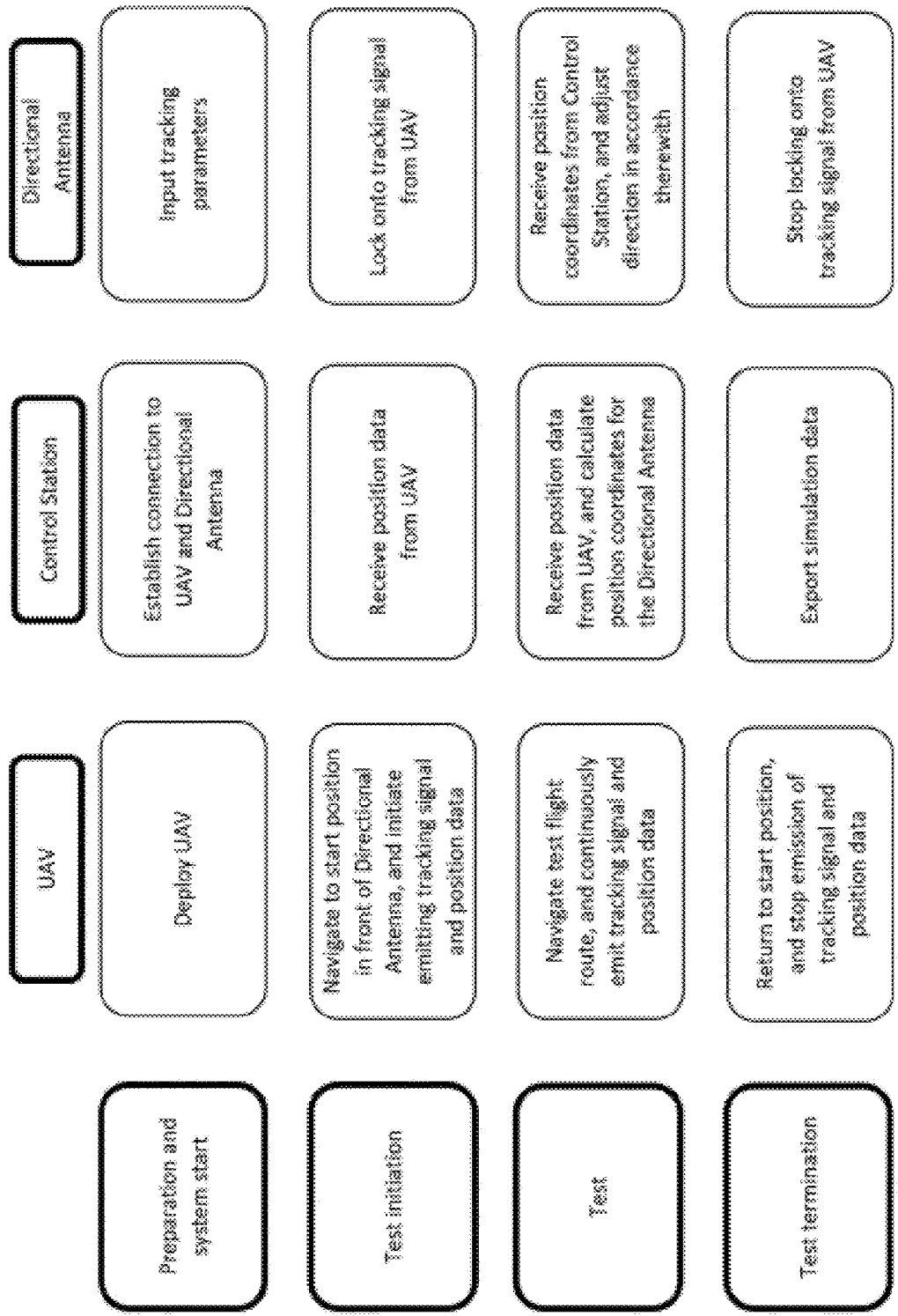
FIG. 6 shows selected process steps of the method in accordance with various embodiments of the invention.

FIG. 6 shows selected process steps of the method in accordance with various embodiments of the invention. The first process step is the "Preparation and system start" step, where a) the UAV is deployed, b) the Control station establishes connection to the UAV and the Directional Antenna, and c) the Directional antenna receives information on tracking parameters. The second step is the "Test initiation" step, where a) the UAV is navigated to the start position in front of the Directional antenna, and initiates emitting the tracking signal and position data, b) the Control station starts to receive position data from the UAV, and c) the Directional antenna locks onto the tracking signal from the UAV. The third step is the "Test step", where a) the UAV starts to navigate the test flight route, and continuously emits the tracking signal and position data, b) the Control station receives position data from the UAV, and calculates position coordinates for the Directional antenna, and c) the Directional antenna receives position coordinates from the Control station, and adjusts its direction in accordance therewith. The fourth step is the "Test termination" step, where a) the UAV returns to the start position, and stops the emission of the tracking signal and position data, b) the Control station exports the simulation data for analysis, and c) the Directional antenna stops locking onto the tracking signal from the UAV.

Figure 7:
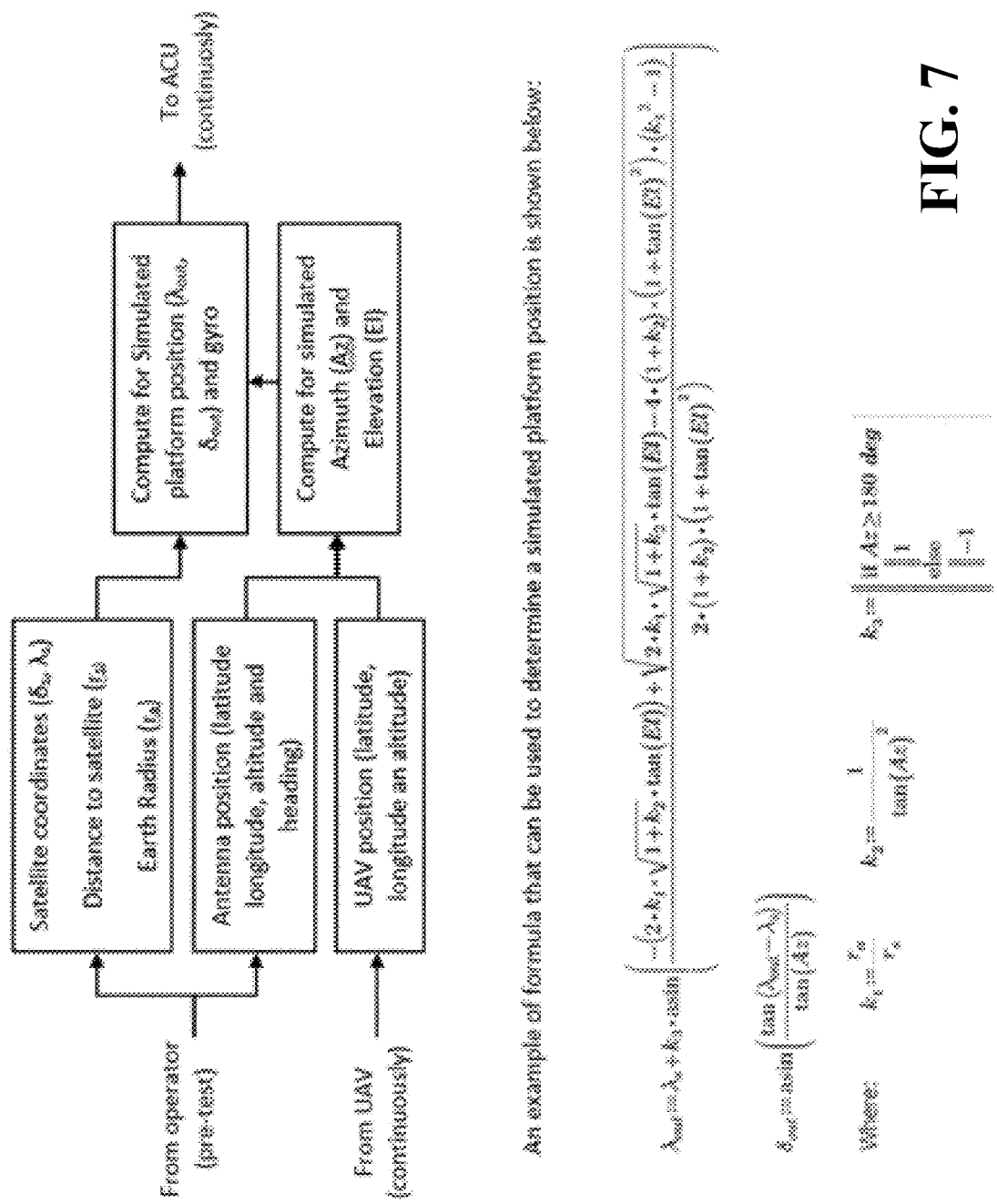
FIG. 7 shows an example of calculating simulated positioning data of a directional antenna based on the positioning data of the unmanned aerial vehicle.

FIG. 7 shows an example for calculating simulated positioning data of a directional antenna based on the positioning data of the unmanned aerial vehicle.

1. First process is the pre-test input from the operator:

a. Satellite coordinates (latitude and longitude of the satellite); and distance to satellite (e.g. typical for geosynchronous orbits satellites is 42164 km), Radius of the Earth; and b. Antenna real position during test (e.g. latitude, longitude, altitude, and platform heading);

2. 1.b is continuously coupled with the received UAV position (e.g. latitude, longitude, altitude) to compute for simulated Azimuth (Az) and Elevation (El);

3. 1.a is then coupled with 2 to compute for Simulated platform position (platform latitude, longitude and heading; in this example only latitude and longitude);

4. The said calculated simulated positioning data is transmitted to the control unit of an automatic positioning means of a directional antenna.

The Earth ellipsoid model can as well be introduced in the formula for more accurate results (optional). Other variations of this formula are known and can be used.

What is claimed is:

1. Use of an unmanned aerial vehicle and a control station for testing accuracy of an automatic positioning means of a signal tracking antenna during a signal searching or tracking operation; wherein a platform on which the signal tracking antenna is mounted is kept stationary during a testing operation;

wherein the unmanned aerial vehicle is configured for:

transmitting, while navigating a flight route, a signal configured for the signal tracking antenna to search for or to track;

wherein the control station is configured for:

receiving positioning data from the automatic positioning means during a predefined test period; and receiving data from the signal tracking antenna, about the received signal from the unmanned aerial vehicle during said predefined test period, wherein the received data comprises signal strength data;
receiving positioning data from the unmanned aerial vehicle during a test period; and
instructing the automatic positioning means to initiate or continue the signal searching or tracking operation based on the positioning data from the unmanned aerial vehicle.

2. Use according to claim 1, wherein the control station is configured to output the received positioning data, and the data about the received signal or compare the received positioning data, and the data about the received signal with reference values from previous tests or with data sheets from an antenna manufacturer.

3. Use according to claim 1, wherein the control station is further configured to:
compare the received positioning data from the unmanned aerial vehicle, the positioning data from the automatic positioning means, and the data about the received signal with reference values from previous tests.

4. Use according to claim 1, wherein the control station is further configured for
calculating simulated positioning data of a directional antenna; and
transmitting said calculated simulated positioning data to a control unit of an automatic positioning means of the directional antenna;
wherein the calculation of the simulated positioning data of the directional antenna is based on the positioning data from the unmanned aerial vehicle.

5. Use according to claim 1, wherein the unmanned aerial vehicle is configured for continuously transmitting its position to the control station.

6. Use according to claim 1, wherein the control station is integrated into the stabilized satellite communication antenna.

7. Use according to claim 1, wherein the unmanned aerial vehicle is further configured for:
receiving a test flight route from the control station;
automatically navigating the received test flight route with aid of a received Global Navigation Satellite System signal; and
wherein the control station is further configured for:
transmitting a test flight route signal to the unmanned aerial vehicle.

8. Use according to claim 1, wherein the signal tracking antenna is a Communication-On-The-Move (COTM) antenna.

9. A system for testing the accuracy of an automatic positioning means of a stabilized communication antenna during a satellite signal searching or tracking operation, the system comprising:
an unmanned aerial vehicle; and
a control station;
wherein the unmanned aerial vehicle is configured for:
transmitting, while navigating a flight route, a signal configured for the signal tracking antenna to search for and/ or to track;
wherein the control station is configured for:
receiving positioning data from the automatic positioning means during a predefined test period; and
receiving data from the signal tracking antenna, about the received signal from the unmanned aerial vehicle during said predefined test period, wherein the received data comprises signal strength data;
receiving positioning data from the unmanned aerial vehicle during a test period; and
comparing the received positioning data from the unmanned aerial vehicle, the positioning data from the automatic positioning means, and data about the received signal with reference values from previous tests.

10. The system according to claim 9, wherein the control station is configured to a) output the received positioning data, and the data about the received signal or b) compare the received positioning data, and the data about the received signal with data sheets from an antenna manufacturer.

11. The system according to claim 9, wherein the control station is configured
to instruct the automatic positioning means to initiate or continue the signal searching or tracking operation based on the positioning data from the unmanned aerial vehicle.

12. The system according to claim 9, wherein the control station is configured for
calculating simulated positioning data of a directional antenna; and
transmitting said calculated simulated positioning data to a control unit of an automatic positioning means of the directional antenna;
wherein the calculation of the simulated positioning data of the directional antenna is based on the positioning data from the unmanned aerial vehicle.

13. The system according to claim 11, wherein the unmanned aerial vehicle is configured for continuously transmitting its position to the control station.

14. The system according to claim 9, wherein the control station is integrated into the signal tracking antenna.

15. The system according to claim 9, wherein the unmanned aerial vehicle is further configured for:
receiving a test flight route from the control station;
automatically navigating the received test flight route with aid of a received Global Navigation Satellite System signal; and
wherein the control station is further configured for:
transmitting a test flight route signal to the unmanned aerial vehicle.

16. The system according to claim 9, wherein the signal tracking antenna is a Communication-On-The-Move (COTM) antenna.

17. A system for testing the accuracy of an automatic positioning means of a stabilized communication antenna during a signal searching or tracking operation, the system comprising:
an unmanned aerial vehicle; and
a control station;
wherein the unmanned aerial vehicle is configured for:
transmitting, while navigating a flight route, a signal configured for the signal tracking antenna to search for or to track;
receiving a test flight route from the control station; and
automatically navigating the received test flight route with the aid of a received Global Navigation Satellite System signal; and
wherein the control station is configured for:
receiving positioning data from the automatic positioning means during a predefined test period;
receiving data, from the signal tracking antenna, about the received signal from the unmanned aerial vehicle during said predefined test period, wherein the received data comprises signal strength data;

receiving positioning data from the unmanned aerial vehicle during a test period;

comparing the received positioning data from the unmanned aerial vehicle, the positioning data from the automatic positioning means, and data about the received signal with reference values from previous tests; and transmitting a test flight route signal to the unmanned aerial vehicle.

\* \* \* \* \*